(12) United States Patent
Miyamaru et al.

(10) Patent No.: US 7,660,656 B2
(45) Date of Patent: Feb. 9, 2010

(54) TRANSMISSION FOR MOTORCYCLE, MOTORCYCLE AND MOTORCYCLE SIMULATION SYSTEM

(75) Inventors: Yukio Miyamaru, Saitama (JP); Sadanao Ichimi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 627 days.

(21) Appl. No.: 11/449,730

(22) Filed: Jun. 9, 2006

(65) Prior Publication Data

US 2006/0293823 A1  Dec. 28, 2006

(30) Foreign Application Priority Data

Jun. 14, 2005  (JP)  .............................. 2005-174185

(51) Int. Cl.
G09B 9/058 (2006.01)
B05B 20/02 (2006.01)

(52) U.S. Cl. .......................................... 701/51; 434/61

(58) Field of Classification Search ........................ None
See application file for complete search history.

(56) References Cited

U.S. PATENT DOCUMENTS

| | | | | |
|---|---|---|---|---|
| 5,006,072 | A | * | 4/1991 | Letovsky et al. ............... 434/61 |
| 5,079,969 | A | * | 1/1992 | Kato et al. .................... 477/109 |
| 5,415,550 | A | * | 5/1995 | Aoki et al. ..................... 434/61 |
| 2004/0093974 | A1 | * | 5/2004 | Nesseth ..................... 74/473.12 |
| 2007/0284849 | A1 | * | 12/2007 | Kosugi et al. ............ 280/288.4 |

FOREIGN PATENT DOCUMENTS

| | | |
|---|---|---|
| DE | 19702788 A1 | 7/1998 |
| DE | 203 20 742 U1 | 4/2005 |
| EP | 1 455 325 A2 | 9/2004 |
| JP | 5-88605 A | 4/1993 |
| JP | 2004-246131 A | 9/2004 |
| JP | 2005-106221 A | 4/2005 |
| WO | WO 2006/011441 A1 * | 2/2006 |

* cited by examiner

*Primary Examiner*—Michael J. Zanelli
(74) *Attorney, Agent, or Firm*—Birch, Stewart, Kolasch & Birch, LLP

(57) ABSTRACT

To realize versatility for corresponding to various speed change systems, and to provide a transmission having a simple configuration. A transmission for a motorcycle has a shift pedal elastically inclined up and down from a reference position with a potentio-sensor for detecting the inclination. A control unit determines a shift position value Po obtained from the potentio-sensor, and outputs the shift position value Po to a predetermined speed change coping unit. A comparative determination unit in the control unit determines the inclination of the gear shift pedal through comparing and judging a range B indicative of the reference position, a range N1 set in a predetermined angle range to the lower direction, a range C1 greater in inclination angle than the range N1, a range N2 in a predetermined angle to the upper direction he range B, and a range C2 greater in inclination angle than the range N2.

20 Claims, 15 Drawing Sheets

| Angle signal A | Position data D | | | |
|---|---|---|---|---|
| | D3 | D2 | D1 | D0 |
| C2 | 1 | 1 | 0 | 0 |
| N2 | 1 | 0 | 0 | 0 |
| B | 0 | 0 | 0 | 0 |
| N1 | 0 | 0 | 1 | 0 |
| C1 | 0 | 0 | 1 | 1 |

FIG. 8

| Po | Position data D | | | | | |
|---|---|---|---|---|---|---|
| | FREE (B) | D3 (N2) | D2 (C2) | D1 (N1) | D0 (C1) | |
| 0 neutral | 0 | 0 | 0 | 0 | 0 | |
| 1 | 0 | -1 | 0 | 0 | +1 | |
| 2 | 0 | 0 | +2 | 0 | 0 | |
| 3 | 0 | 0 | +1 | -2 | -1 | |
| 4 | 0 | 0 | +1 | 0 | -1 | |
| 5 | 0 | 0 | +1 | 0 | -1 | |
| 6 | 0 | 0 | 0 | 0 | -1 | |

FIG. 10

| Po | Position data D | | | | |
|---|---|---|---|---|---|
| | FREE (B) | D3 (N2) | D2 (C2) | D1 (N1) | D0 (C1) |
| 0 neutral | 0 | 0 | +1 | 0 | +4 |
| 1 | 0 | 0 | +1 | 0 | -1 |
| 2 | 0 | 0 | +1 | 0 | -1 |
| 3 | 0 | 0 | +1 | 0 | -1 |
| 4 | 0 | 0 | -4 | 0 | -1 |

TRANSMISSION FOR MOTORCYCLE, MOTORCYCLE AND MOTORCYCLE SIMULATION SYSTEM

CROSS-REFERENCE TO RELATED APPLICATIONS

The present application claims priority under 35 USC 119 to Japanese Patent Application No. 2005-174185 filed on Jun. 14, 2005 the entire contents of which are hereby incorporated by reference.

1. Field of the Invention

The present invention relates to a transmission for a motorcycle which includes a gear shift pedal operated by a driver that is elastically inclined in both directions from a reference position, and to a motorcycle and a simulation system each including the transmission for the motorcycle.

2. Description of Background Art

Simulation systems are known wherein a diversity of operating conditions are displayed on a display according to various operations conducted by the rider, so as to permit the rider to have a simulated experience of the operating conditions of a two-wheel vehicle. These systems have been adopted for the purpose of playing games, providing education regarding cycling and the like. In a two-wheel vehicle simulation system, the operating feelings and methods of the components operated by the rider are desirable to be close to those in the case of a real vehicle. In view of this, the present inventors have proposed simulation systems in which the operating feelings of a gear shift pedal of a transmission can be set close to the gear change feelings in the case of a real vehicle. See, for example, Japanese Patent Laid-open No. 2004-246131 and Japanese Patent Laid-open No. Hei 5-88605.

In the simulation system disclosed in Japanese Patent Laid-open No. 2004-246131, a click generating means includes a ball member that is used, whereby a click feeling is generated at the time of a gear change, and the gear change feeling in the case of a real vehicle is favorably realized. In addition, in the simulation system disclosed in Japanese Patent Laid-open No. Hei 5-88605, a transmission mechanism of a real vehicle is adopted as it is, so that the same feelings as in operating (riding) a real vehicle can be favorably obtained.

On the other hand, in recent years, there has been a tendency to provide transmission mechanisms for motorcycles and the like wherein the electronic control type has progressed, to make it possible to perform transmission operations by use of electrical signals. For example, Japanese Patent Laid-open No. 2005-106221 proposes a V-belt type non-stage transmission in which the speed change ratio can be controlled by a motor-driven type actuator. In the V-belt type non-stage transmission, a V-belt is wrapped around a drive pulley connected to the engine and a driven pulley connected to a load. The wrap-around diameters of the V-belt on the drive pulley and the driven pulley are continuously varied to thereby control the speed change ratio. In addition, for varying the wrap-around diameters of the V-belt, the drive pulley and the driven pulley are each composed of a fixed pulley portion and a movable pulley portion, and the movable pulley portion is displaced along the direction of a support shaft so as to change the distance between both the pulley portions, thereby varying the wrap-around diameter. Thus, it is possible to favorably obtain a speed change ratio which is continuously varied according to the operating conditions.

Furthermore, in the V-belt type non-stage transmission, stepwise transmission can also be achieved according to a selecting operation by the rider, so that it is possible to cope with a speed change ratio according to the rider's intention at the time of operating on a poorly conditioned road and at the time of sporty operation.

Motorcycles are known wherein a transmission is provided with a gear shift pedal that is elastically inclined from a reference position. The pedal is inclined vertically by the tip of a foot to thereby achieve speed reduction. The transmissions of this kind include mainly the return system and the rotary system. In the return system, a first speed is obtained when the gear shift pedal is stepped downwardly from the reference position. Returning to neutral is attained when the gear shift pedal is returned to the reference position and thereafter pulled slightly upward. Further, a second speed is obtained when the gear shift pedal is largely pulled up. In addition, returning to neutral is attained when the gear shift pedal is reversely stepped in slightly from the second speed state, and first speed is obtained when the gear shift pedal is largely stepped in. In the simulation system for reproducing the operations of a motorcycle, it is also preferable that the operations in the return system transmission as just-mentioned can be faithfully realized.

On the other hand, in the method described in Japanese Patent Laid-open No. 2004-246131, to achieve different speed changes according to the inclination angle of the gear shift pedal is not assumed. In addition, in the method described in Japanese Patent Laid-open No. Hei 5-88605, since the transmission mechanism of a real vehicle is adopted, the operations of the return system can be reproduced, but the system is complicated in structure and expensive. More specifically, it is necessary to provide a shift arm and a shift drum which are the same as those in the transmission mechanism of a real vehicle, and to provide a special switch for detecting the shift position. In addition, when it is desired to change the speed change system in the case where the transmission mechanism of a real vehicle is adopted, it is necessary to replace the transmission mechanism as a whole, which is inconvenient in use. Further, even operations according to the inclination angle are achieved on a mechanism basis, it has not been realized to actually detect the operations and reflect them on the control.

Furthermore, in an up-down switch type operation system used in a game machine and the like, it is also difficult to make an operation of returning to neutral by a small inclination, so that a complicated configuration such as a provision of a separate switch used exclusively for neutral necessarily must be adopted.

In addition, if a transmission is simple and versatile, the transmission is favorably applicable not only to a simulation system but also to a real vehicle.

SUMMARY AND OBJECTS OF THE INVENTION

The present invention has been made in consideration of the above-mentioned problems. Accordingly, it is an object of an embodiment of the present invention to provide a transmission for a motorcycle, a motorcycle, and a simulation system for motorcycle which permits a speed change coping process by the same operating method as in a conventional real vehicle and which is simple and versatile in configuration.

According to an object of an embodiment of the present invention, a transmission for a motorcycle includes a gear shift pedal operated by a driver and elastically inclined to both directions from a reference position. A position detecting means is provided for detecting the inclination of the gear shift pedal with a control unit for determining a shift position value based on the inclination of the gear shift pedal obtained from the position detecting means and outputting the shift position value to a predetermined speed change coping unit. The position detecting means detects the inclination of the gear shift pedal through detecting the reference position, a neutral detection position set in a predetermined range of an angle from the reference position, and a gear change position that is greater in an inclination angle than the neutral detection position.

Thus, the neutral detection position at a predetermined angle from the reference position and the gear change position that is greater in the inclination angle than the neutral detection position are detected in regard of the inclination angle of the gear shift pedal, and the control unit determines the shift position value based on the detection signal. Thus, it is possible to carry out a speed change coping process by the same operating method as that in a conventional real vehicle of the return system, the rotary system, or the like, based on programs and data in the control unit. In addition, a shift arm, a shift drum, and the like provided in the transmission mechanism in the conventional real vehicle are omitted. Thus, a simple configuration is achieved.

In this case, preferably, the position detecting means includes a rotation sensor operative in conjunction with the rotation of a rotary shaft of the gear shift pedal, and a comparative determination unit for comparing an angular signal obtained from the rotation sensor with a threshold and outputting signals indicative of the reference position, the neutral detection position, and the gear change position.

With the rotation sensor and the comparative determination unit thus used, a threshold according to the range of inclination of the corresponding gear shift pedal is appropriately set, whereby this system can be applied to a variety of gear shift pedals.

The position detecting means may include a switch having a plurality of contacts, and the switch may have a contact configuration for outputting signals indicative of the reference position, the neutral detection position, and the gear change position, according to the inclination angle of the gear shift petal. With this switch being used for the position detecting means, a simple and inexpensive configuration is attained.

In addition, the control unit may initialize the shift position value to neutral at the time of an initial state. This eliminates the need for labor for checking the position at the time of starting the operation.

Further, a configuration may be adopted in which the neutral detection position includes a first neutral detection position set in a first direction from the reference position, and a second neutral detection position set in a second direction from the reference position. The gear change position includes a first gear change position greater in an inclination angle than the first neutral detection position and a second gear change position greater in an inclination angle than the second neutral detection position. This permits the transmission for motorcycle to be further versatilely applied.

Furthermore, preferably, the control unit sets the shift position value to a first speed and second speed when signals indicative of the first gear change position and the second gear change position are supplied from the position detecting means in the case where the shift position value is neutral and returns the shift position value to neutral when the second neutral detection position is supplied in the case where the shift position value is a first speed or when the first neutral position is supplied in the case where the shift position value is a second speed. This ensures that the speed change operations in the return system are reproduced faithfully, which ensures that a rider accustomed to the speed change operations in the conventional motorcycle can easily be accustomed to the transmission for the motorcycle. In addition, where the transmission for the motorcycle is applied to a simulation system, the realism can be further enhanced.

The control unit may count the shift position value when a signal indicative of the first or second gear change position is again supplied in the case where the signal received from the position detecting means has been changed over from a signal indicative of the first or second gear change position to a signal indicative of the first or second neutral position. This ensures that at the time of a further shift-up operation in the case where the shift position value is in the range of a second speed to 5th speed or at the time of a further shift-down operation in the case where the shift position value is in the range of 6th speed to the second speed, the next shift operation can be performed by only returning the gear shift pedal being in the first or second gear change position to the first or second neutral position, without need to return the gear shift pedal to the reference position. Therefore, the operating method is the same as that in the conventional transmission, and it is possible to perform a speed change operations quickly without a sense of incompatibility.

The transmission for a motorcycle can be favorably applied to motorcycles and motorcycle simulation systems.

According to the transmission for a motorcycle, the motorcycle, and the motorcycle simulation system of the present invention, when it is detected that the neutral detection position is at a predetermined angle from the reference position and the gear change position is greater in an inclination angle than the neutral detection position in regard of the inclination angle of the gear shift pedal, and the control unit determines a shift position value based on the detection signal, it is possible to perform a speed change coping process by the same operating method as that in the case of a conventional real vehicle of the return system, the rotary system, or the like, based on the program setting in the control unit. In addition, a shift arm, a shift drum, and the like provided in the transmission mechanism of a conventional real vehicle are omitted, whereby a simple and inexpensive configuration is achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 shows the contents of position data set in the comparative determination unit;

FIG. 10 shows the contents of a reference table corresponding to the six-speed return system;

FIG. 11 shows the contents of a reference table corresponding to the four-speed rotary system;

DETAILED DESCRIPTION OF THE PREFERRED EMBODIMENTS

Now, the transmission for a motorcycle, the motorcycle, and the motorcycle simulation system according to the present invention will be described below through embodiments thereof, referring to the FIGS. 1 to 15. First, embodiments of the transmission for a motorcycle and the motorcycle simulation system will be described.

Figure 1:
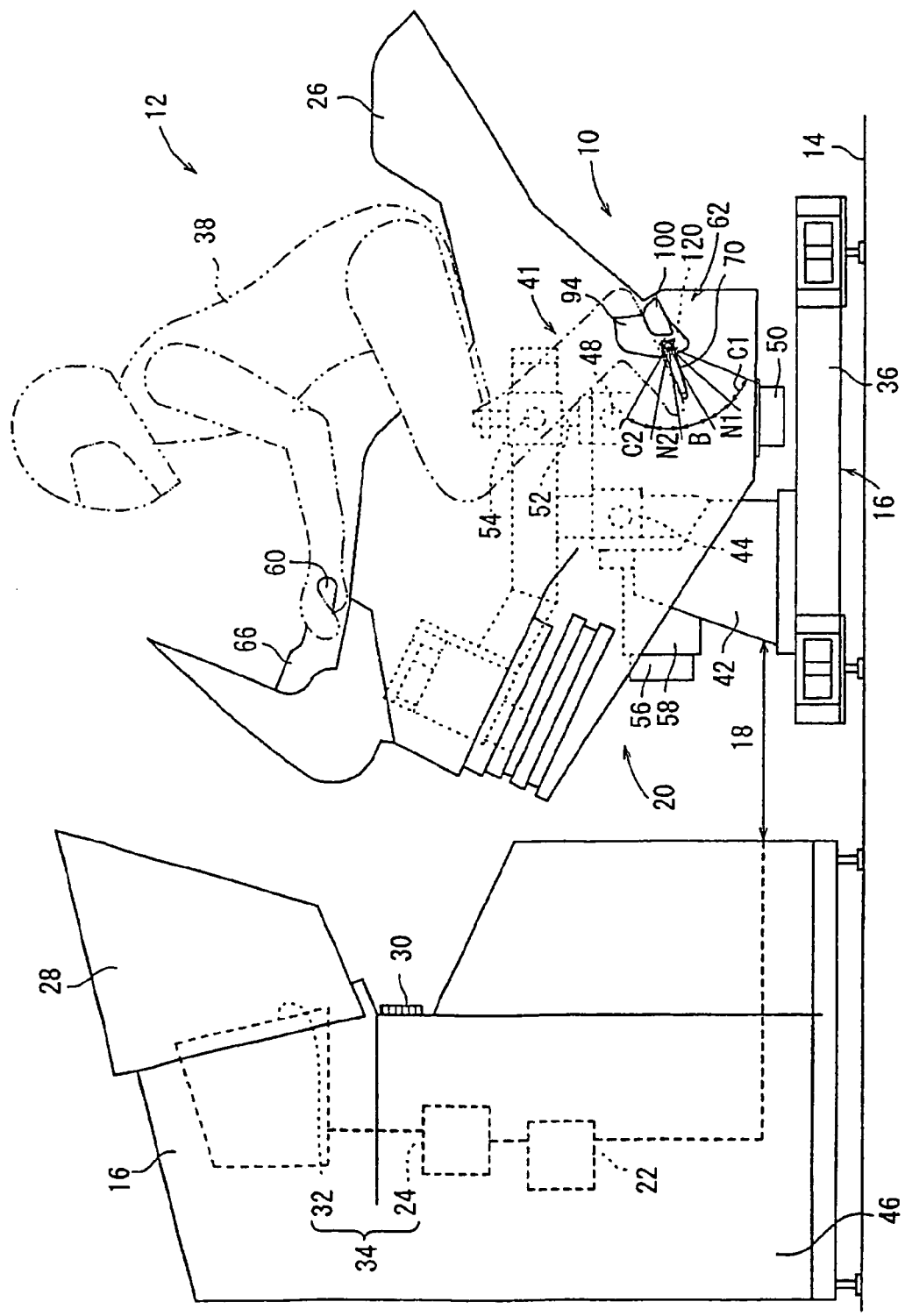
FIG. 1 is a schematic side view of a simulation system on which a transmission is mounted.

The transmission (transmission for motorcycle) 10 and the simulation system (motorcycle simulation system) 12 according to this embodiment are shown in FIG. 1. The simulation system 12 includes a control console 16 installed on a floor surface 14, and a motion unit 20 which can freely be detachably attached to the control console 16 through a joint portion 18. The motion unit 20 includes a dummy two-wheel vehicle 26.

The control console 16 includes a storage portion 46 for containing a, control unit 22 such as a minicomputer and a CGI device 24 therein, and a display box 28 provided at an upper portion of the storage portion 46. The display box 28 has a loudspeaker 30 incorporated therein, and a projection type screen 32 having a screen. Of the system, the transmission 10 has a pedal unit 62 and a control unit 22. As will be described later, the inclination of a gear shift pedal 70 is detected distinctly in the ranges B, N1, C1, N2, and C2 by a comparative determination unit 170 of the control unit 22, based on a signal from a potentio-sensor 120 in the pedal unit 62.

A display system 34 is composed basically of the screen 32 and the CGI device 24, and various operating conditions inclusive of a operating path that are displayed as an operating scene picture on the screen 32. In this case, the CGI device 24 rapidly displays motion patterns of moving bodies (e.g., vehicles) and still bodies (e.g., scenery, operating path, traffic signal) on the screen 32, by use of data transmitted from the control unit 22 and its own computer (inclusive of CPU, ROM, RAM, large-capacity storage device such as hard disk, and the like).

The motion unit 20 includes a base 36 which can be detachably mounted to the control console 16 through the joint portion 18, and a dummy two-wheel vehicle 26 and a drive mechanism 41 are mounted on the base 36. The dummy two-wheel vehicle 26 is modeled after a motorcycle and is capable of being operated by a rider 38. The drive mechanism 41 is for driving the dummy two-wheel vehicle 26 according to the behaviors of a real two-wheel vehicle.

A support frame 42 is provided on the base 36, and the dummy two-wheel vehicle 26 is supported on the upper portion side of the support frame 42 so that it can be swung in the front-rear direction (pitching direction) through a pitching shaft 44 (see FIG. 3 also) extending in the vehicle width direction. In addition, a pitch motor 50 swingable about a fulcrum 48 is supported on the support frame 42, and a nut 54 swingably supported on the dummy two-wheel vehicle 26 is engaged with a screw shaft 52 connected to the pitch motor 50. Further, a roll motor 58 having a roll shaft 56 in a horizontal direction is supported on the support shaft 42, and the dummy two-wheel vehicle 26 is engaged with an output shaft (not shown) of the roll motor 58.

The dummy two-wheel vehicle 26 has a steering handle 60 manually operated by the rider 38, the pedal unit 62 operated by the tip of the left foot, and a foot brake pedal 126 (see FIG. 5) operated by the tip of the right foot. The steering handle 60 is turnable to the left and the right, and includes a throttle grip 128, a clutch lever angle sensor 132, a foot brake sensor 127 (see FIG. 5), and various operation switches (blinker switch, horn switch, etc.). A monitor 66 for displaying a simulated operating velocity, a simulated engine speed, and the like is provided at a well-visible portion of a central portion of the steering handle 60.

Figure 2:
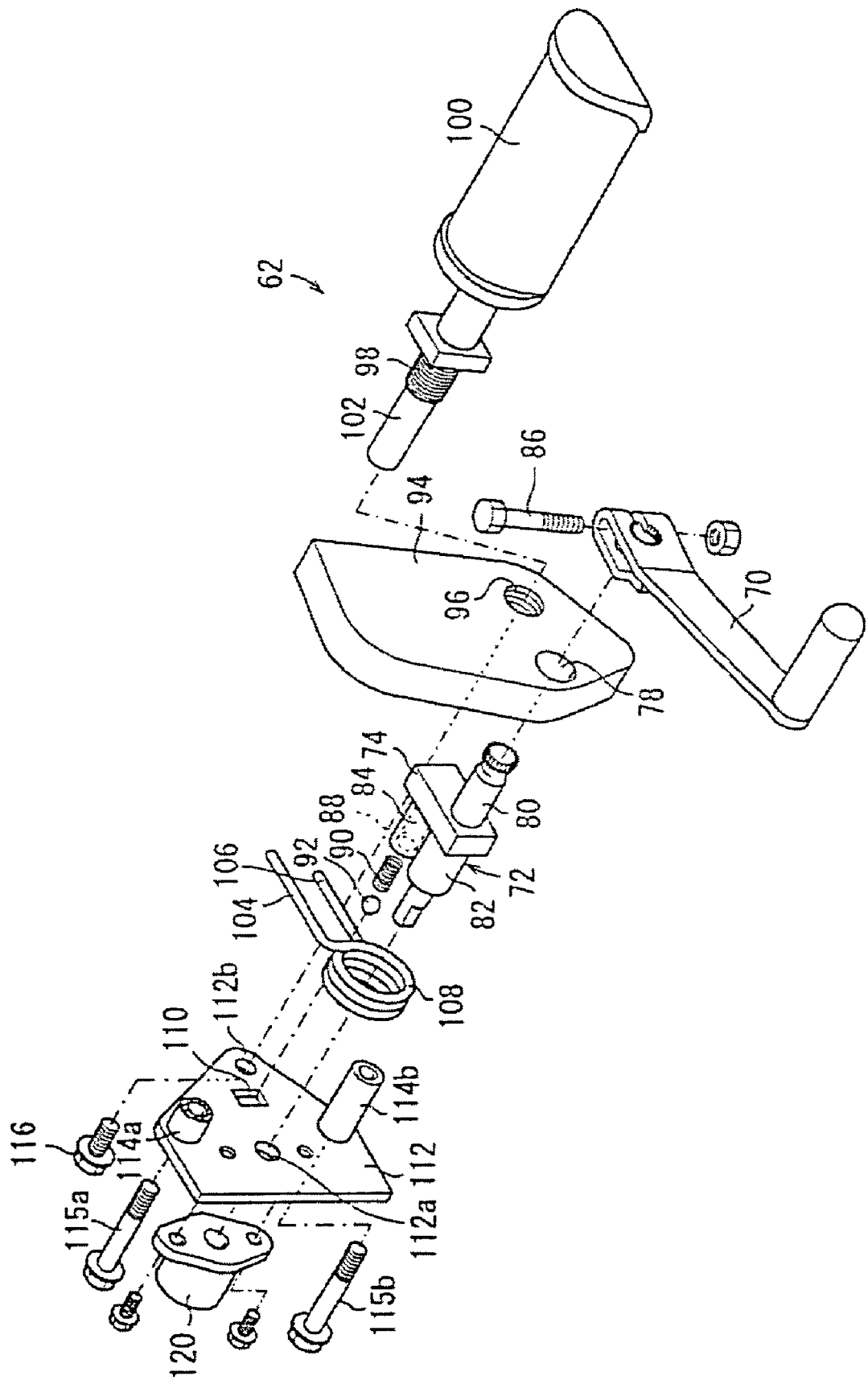
FIG. 2 is an exploded perspective view of a pedal unit in the transmission.
Figure 3:
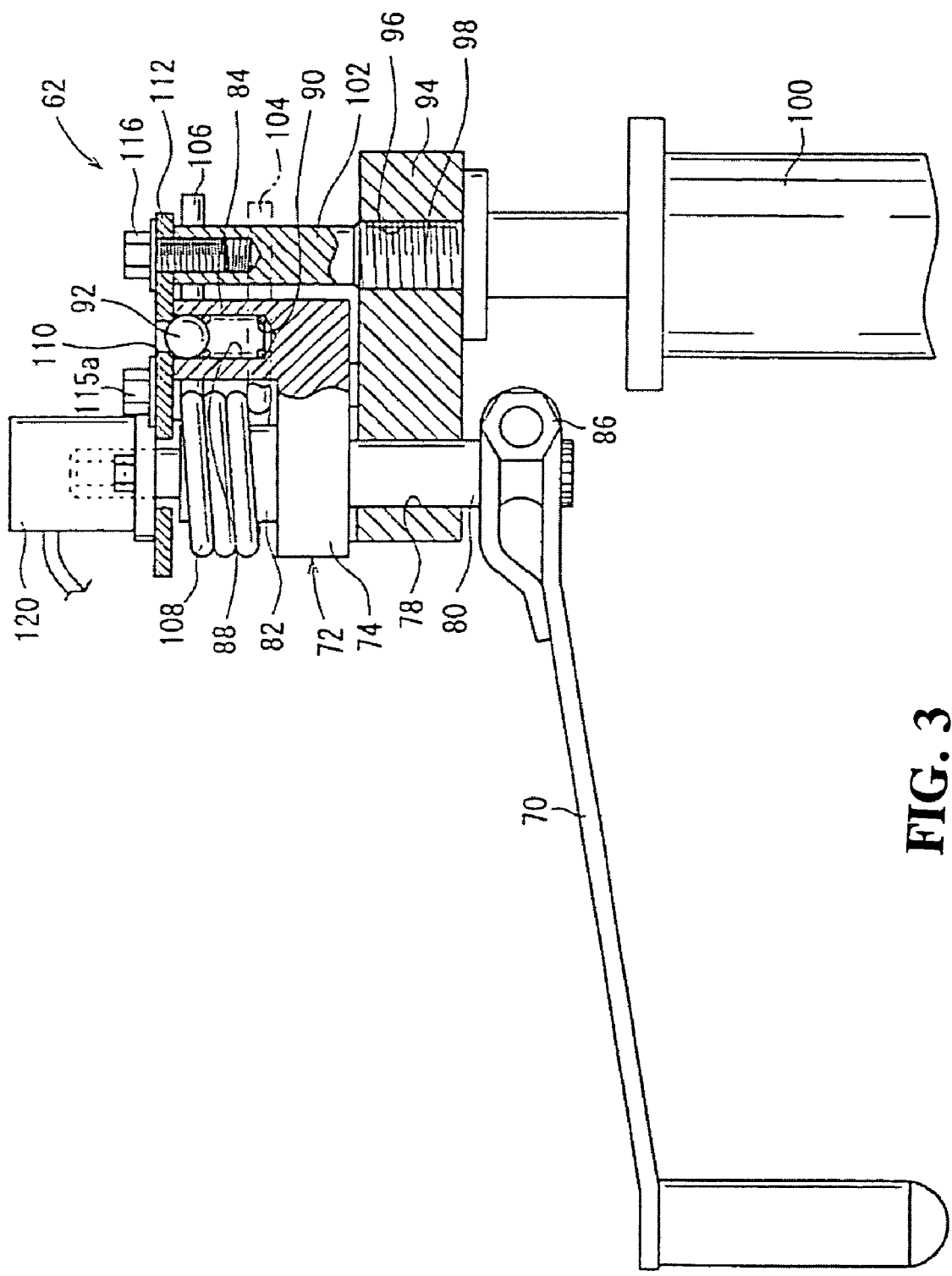
FIG. 3 is a sectional plan view of the pedal unit in the transmission.

As shown in FIGS. 2 and 3, the pedal unit 62 has a support member 72 for supporting a gear shift pedal 70 connected thereto so that the gear shift pedal 70 can be turned within a predetermined angle. The support member 72 is composed of a rectangular block body 74, a first shaft portion 80 having an end portion which penetrates through a hole 78 in a mount plate 94 and to which the gear shift pedal 70 is connected, a stepped second shaft portion 82 extending coaxially with and to the opposite side of the first shaft portion 80 with the block body 74 therebetween, and a third shaft portion 84 projecting at a portion close to the second shaft portion 82 roughly in parallel to the second shaft portion 82, and the block body 74 and the first to third shaft portions 80, 82, 84 are configured integrally. The gear shift pedal 70 is fixed and fastened by clamping the second shaft portion 82 by fastening a bolt 86. The fastening portion is in a serrated shape for preventing rotational deviations.

The third shaft portion 84 is provided with a bottomed hole 88 extending over a predetermined length along the axial direction from an end portion, and a coil spring 90 and a steel ball 92 engaged to an end portion of the coil spring 90 are provided in the bottomed hole 88.

Further, the pedal unit 62 includes a support shaft 102 having a screw portion 98 for engagement with a screw hole 96 in the mount plate 94 and having an end portion which penetrates through the mount plate 94 and to which a step 100 is connected, a torsion type return spring 108 which is wound around the second shaft portion 82 and between both end portions 104, 106 of which the support shaft 102 is engaged, and a plate-shaped cover member 112 provided with a hole 110 for engagement with the steel ball 92. The return spring 108 is engaged with the support shaft 102, and has a function of holding the gear shift pedal 70 in a roughly horizontal reference position under the action of a spring force. The second shaft portion 82 is inserted into a hole 112a in the cover member 112, to project to the opposite side. The hole 110 has a diameter and a depth which are so set that a part of the steel ball 92 can be engaged therewith.

Furthermore, the pedal unit 62 includes a pair of sleeves 114a and 114b interposed between the mount plate 94 and the cover member 112 so as to function as stoppers, a pair of bolts 115a and 115b inserted in through-holes in the sleeves 114a and 114b, and a screw member 116 put into screw engagement with a screw hole in the support shaft 102. The cover member 112 and the mount plate 94 are mounted roughly in parallel, through the pair of bolts 115a, 115b and the screw member 116.

The hole 110 is provided on a line connecting between the hole 112a and a hole 112b to be screw engaged with the screw portion 98 of the support shaft 102, and is set so that a part of the steel ball 92 is engaged therewith when the gear shift pedal 70 has been returned to the reference position by the return spring 108.

In addition, the pedal unit 62 has the potentio-sensor (position detecting means) 120 as a rotation sensor connected to the second shaft portion 82 projecting from the cover member 112. The potentio-sensor 120 has a detection shaft engaged with the second shaft portion 82 and rotated as one body with the second shaft portion 82, thereby to detect the inclination angle of the gear shift pedal 70 and to supply a detection signal to the control console 16.

When the operator 38 pulls up or steps down the gear shift pedal 70 to perform a shift change (shift-up or shift-down), the gear shift pedal 70 is turned by a predetermined angle with the first shaft portion 80 as a fulcrum, and the third shaft portion 84 projecting from the opposite side of the first shaft portion 80 is turned by a predetermined angle about and integrally with the second shaft portion 82.

More specifically, when the gear shift pedal 70 is slightly stepped in, the third shaft portion 84 of the support member 72 rises against an elastic force of the return spring 108 while pushing the end portion 104 wider, and is inclined with the first and second shaft portions 80, 82 as a center. In this case, the steel ball 92 mounted in the bottomed hole 88 is displaced as one body with the third shaft portion 84, and comes off from the hole 110 against the elastic force of the coil spring 90 (see FIG. 4). In this instance, a slight vibration is generated together with a click sound "click" attendant on the movement of the steel ball 92, so that the rider 38 can confirm the inclination of the gear shift pedal 70 through a tactile sense at the tip of his foot and through auditory sense.

When the gear shift pedal 70 is then stepped in further, the steel ball 92 slightly rolls on the surface of the cover member 112, and the third shaft 84 comes into contact with the sleeve 114a, whereby the displacement is restricted. By the restriction, the rider 38 can confirm the further movement of the gear shift pedal 70.

In addition, when the operator 38 puts the tip of his foot off the gear shift pedal 70, the gear shift pedal 70 is returned to the reference position by the action of the return spring 108.

Further, when the gear shift pedal 70 is pulled up, the same action as at the time of stepping in the gear shift pedal 70 is displayed. More specifically, when the gear shift pedal 70 is slightly pulled up, the third shaft portion 84 is moved while elastically stepping in the end portion 106, and the steel ball 92 comes off from the hole 110, whereby a click sound and a faint vibration are generated. When the gear shift pedal 70 is pulled up further, the third shaft portion 84 comes into contact with the sleeve 114b, whereby the displacement is restricted. In addition, when the foot is put off from the gear shift pedal 70, the gear shift pedal 70 is automatically returned to the reference position.

In the pedal unit 62, the gear shift pedal 70 can be elastically inclined up and down as above-mentioned. In this case, the inclination angle of the gear shift pedal 70 is detected by the potentio-sensor 120. In the control unit 22, the inclination angle can be recognized based on the detection signal supplied from the potentio-sensor 120.

Figure 5:
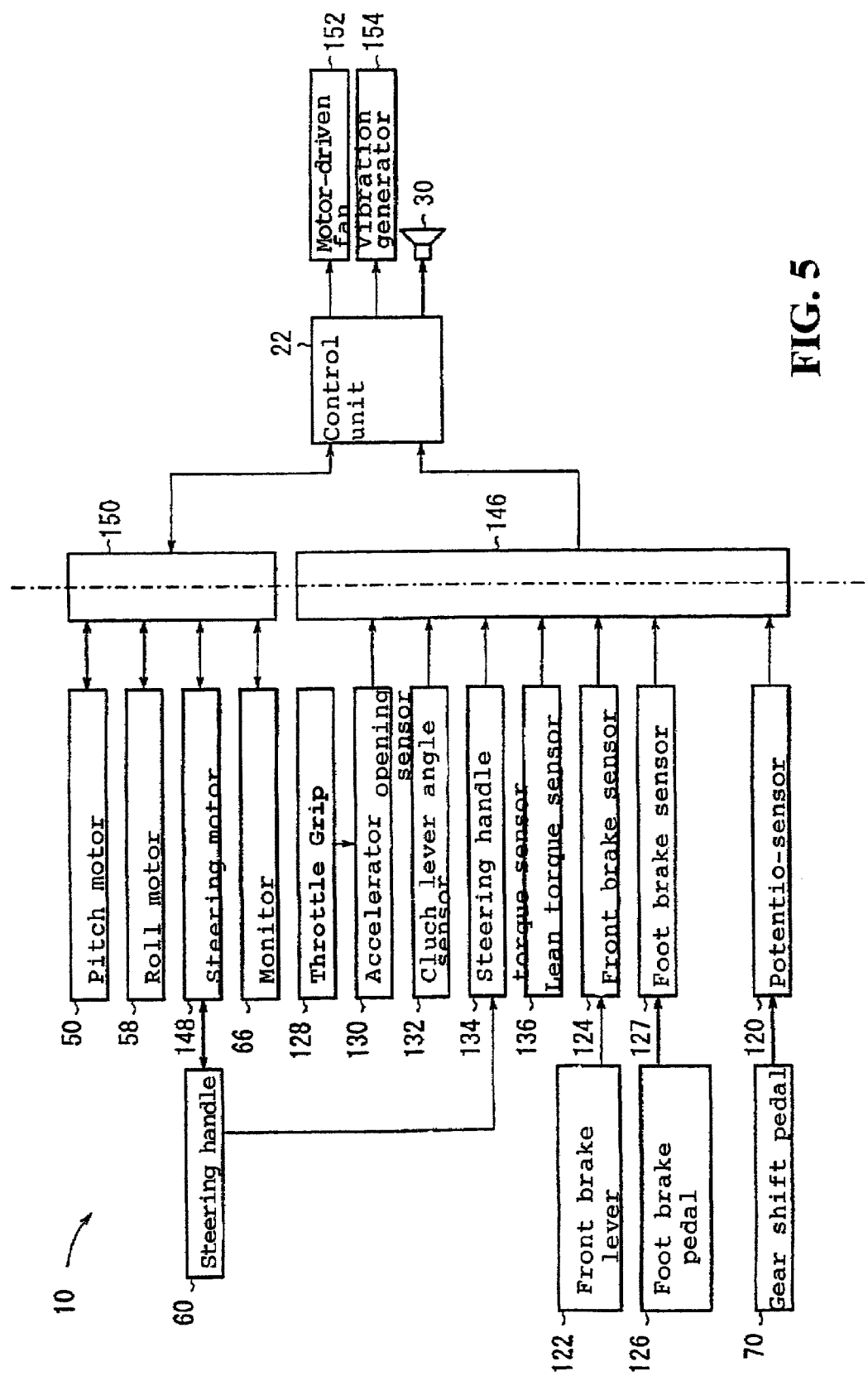
FIG. 5 is a block diagram of the simulation system.

As shown in FIG. 5, on the side of the motion unit 20, a front brake sensor 124 is connected to a front brake lever 122 operated by the right hand of the rider 38 with a foot brake sensor 127 being connected to a foot brake pedal 126. An accelerator opening sensor 130 is connected to a throttle grip 128 which is an accelerator with a clutch lever angle sensor 132 with a steering handle torque sensor 134 and a lean torque sensor 136 being provided. A front brake sensor 124 is provided together with a steering handle switch 140 having a predetermined group of switches, and the potentio-sensor 120 that are connected to one end side of a connector 146 through signal wires. In addition, the pitch motor 50, the roll motor 58, and a steering motor 148 constituting the drive mechanism 41 are connected to one end side of a connector 150 through signal wires. On the other hand, on the control side, the control unit 22 is provided which is connected to the other end side of the connectors 146, 150 through signal wires.

A motor-driven fan 152 for blowing air to the operator 38, a vibration generator 154, the loudspeaker unit 30 and the display system 34 are connected to the control unit 22. When information on the dummy two-wheel vehicle 26 is transmitted from the control unit 22 to the CGI device 24 constituting the display system 34, a picture according to the information on the dummy two-wheel vehicle 26 is displayed on the screen 32.

Figure 6:
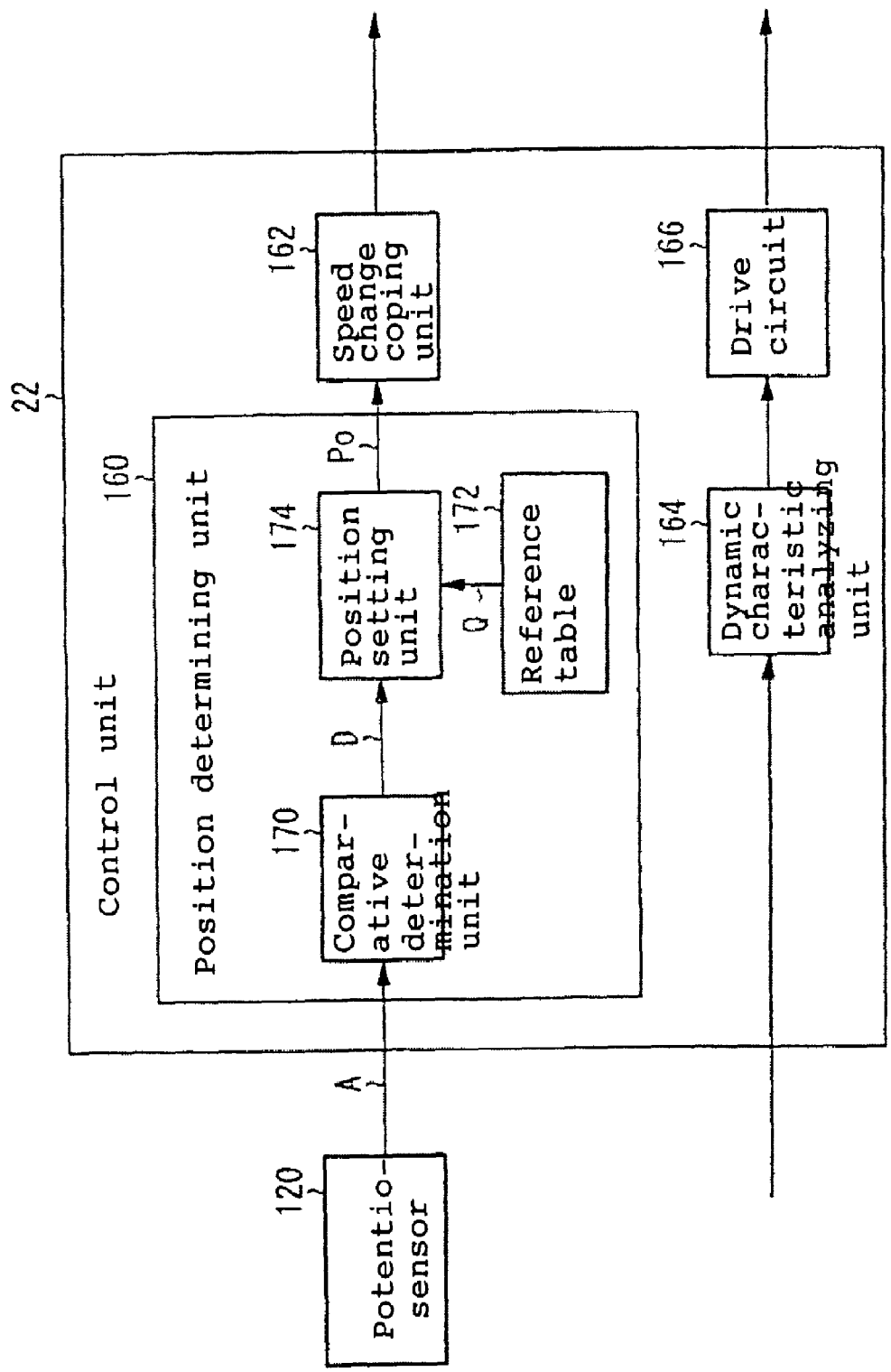
FIG. 6 is a block diagram of a control unit.

As shown in FIG. 6, the control unit 22 has a position determining unit 160 for determining a shift position value Po based on the detection signal obtained from the potentio-sensor 120 and the speed change coping unit 162 for performing a predetermined speed change process based on the shift position value Po is obtained. The process executed in the speed change coping unit 162 includes, for example, a process for determining the simulated vehicle velocity based on the shift position value Po and a simulated engine speed, a process for determining a braking force by engine brake based on the shift position value Po, a process for generating an engine sound corresponding to the shift position value Po from the loudspeaker unit 30, etc. In addition, it is recommendable that the simulated vehicle velocity obtained is displayed on the monitor 66 and is made to correspond to the speed of change of a scene displayed on the screen 32. Further, the control unit 22 has a dynamic characteristic analyzing unit 164 for analyzing and setting dynamic simulated running conditions from signals from the throttle grip 128, the lean torque sensor 136, and the like, and a drive circuit 166 for controlling the drive mechanism 41 based on the analytical results is obtained.

The position determining unit 160 has a comparative determination unit 170 for outputting signals indicative of the reference position, the first neutral detection position, the first gear change position, the second neutral detection position, and the second gear change position as 4-bit position data D by comparing the angle signal obtained from the potentio-sensor 120 with a threshold, and a position setting unit 174 for determining the shift position value Po based on the thus obtained position data D while referring to a reference table (look-up table) 172. The reference table 172 corresponds to the so-called six-speed return system, but a reference table 172a (see FIG. 11) corresponding to the four-speed rotary system may be selected and set. These functional units in the control unit 22 are realized mainly by software processes of which the programs are read and executed by a CPU (not shown).

Now, the action of the transmission 10 in the simulation system 12 configured as above will be described below. First, a process of determining the 4-bit position data D by the comparative determination unit 170 will be described referring to FIG. 7. The process wherein the comparative determination unit 170 is executed repeatedly on the basis of a predetermined very short time.

First, in step S1, a detection signal is read in from the potentio-sensor 120, as an angle signal A having been digitized by A/D conversion, through a predetermined input interface.

Figure 4:
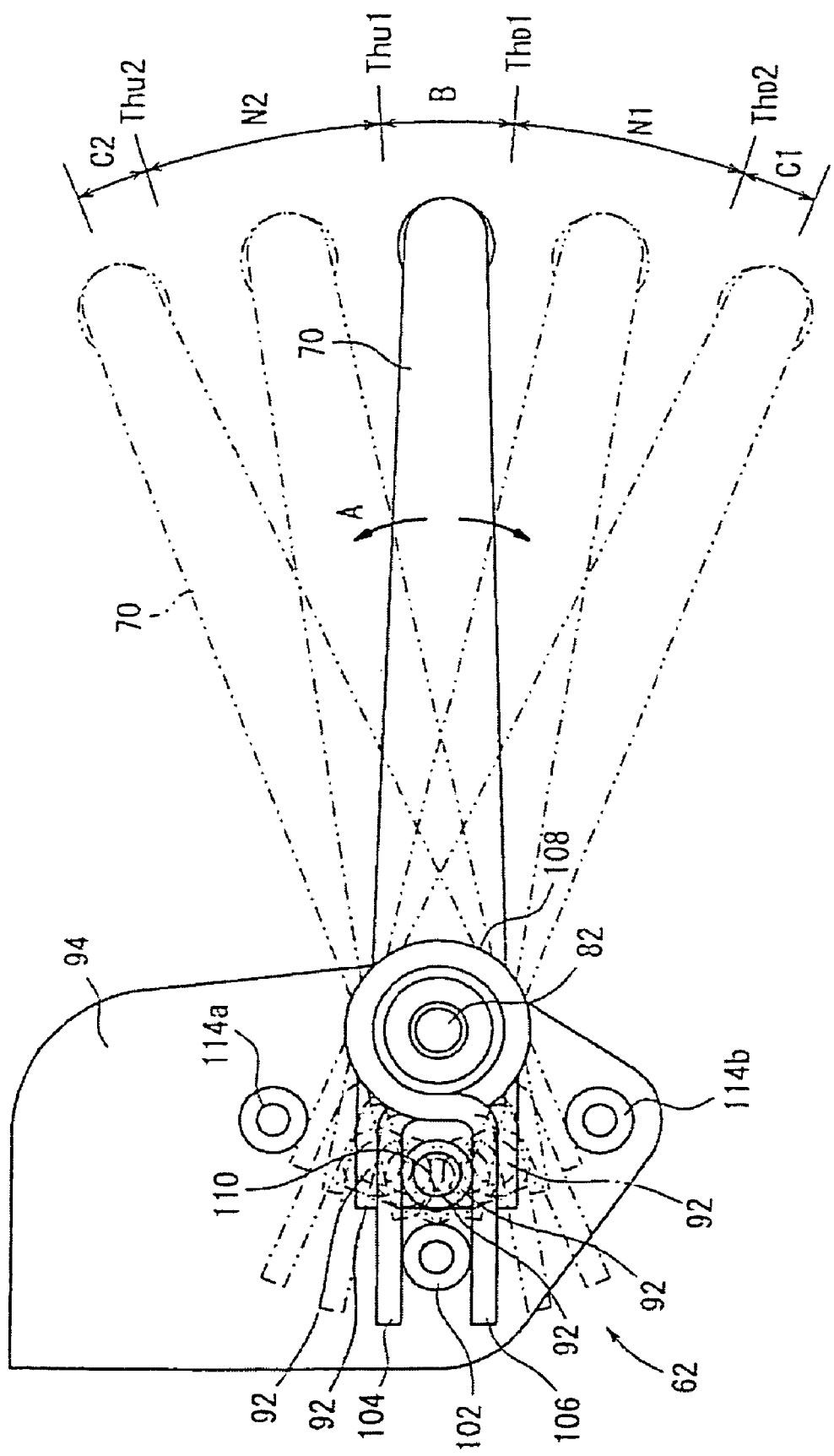
FIG. 4 is a sectional side view of the pedal unit in the transmission.

In step S2, as shown in FIG. 4, the angle signal A is compared with an upper first threshold $Th_U1$, an upper second threshold $Th_U2$, a lower first threshold $Th_D1$, and a lower second threshold $Th_D2$, to determine in which of the ranges demarcated by the thresholds the angle signal A is present. Here, the upper first threshold $Th_U1$ and the lower first threshold $Th_D1$ are set at positions slightly on the upper side and the lower side of the reference position. When the angle signal A is in the range B between these thresholds, it is determined that the gear shift pedal 70 is present at the reference position.

In addition, the lower second threshold $Th_D2$ is set as a value slightly smaller than the lower first threshold $Th_D1$. When the angle signal A is between the lower first threshold $Th_D1$ and the lower second threshold $Th_D2$, it is determined that the gear shift pedal 70 is present in a range N1 indicative of the first neutral detection position. Further, when the angle signal A is smaller than the lower second threshold $Th_D2$, it is determined that the gear shift pedal 70 is present in a range C1 indicative of the first gear change position.

On the other hand, symmetrically with the above, the upper second threshold $Th_U2$ is set as a value slightly greater than the upper first threshold $Th_U1$. When the angle signal A is present between the upper first threshold $Th_U1$ and the upper second threshold $Th_U2$, it is determined that the gear shift pedal 70 is present in a range N2 indicative of the second neutral detection position. Further, when the angle signal A is greater than the upper second threshold $Th_U2$, it is determined that the gear shift pedal 70 is present in a range C2 indicative of the second gear change position.

The values of the upper first threshold $Th_U1$, the upper second threshold $Th_U2$, the lower first threshold $Th_D1$, and the lower second threshold $Th_D2$ can be appropriately changed according to engagement conditions according to the sizes of the steel ball 92 and the hole 110, and the positions of the sleeves 114a, 114b, so that the process is high in versatility for corresponding to a variety of pedal units 62.

In step S3, it is checked whether or not the range indicated by the angle signal A is the same as the precedent-time range. Step S6 is entered when the current range is the same as the precedent-time range, whereas step S4 is entered when the current range is different from the precedent-time range.

In step S4, the position data D is updated and supplied to the position setting unit 174. More specifically, as shown in FIG. 8, the position data D is set as a binary number 0000 when indicating the range B, a binary number 0010 when indicating the range N1, a binary number 0100 when indicating the range C1, a binary number 1000 when indicating the range N2, and a binary number 1100 when indicating the range C2, before being supplied. The position data D is prescribed on a bit basis, as bit data D0, D1, D2, and D3, in this order from the lower bit side toward the upper bit side.

In step S5, the current range is recorded and stored in a predetermined recording unit. The value thus recorded will be used as the precedent-time range in step S3.

Figure 7:
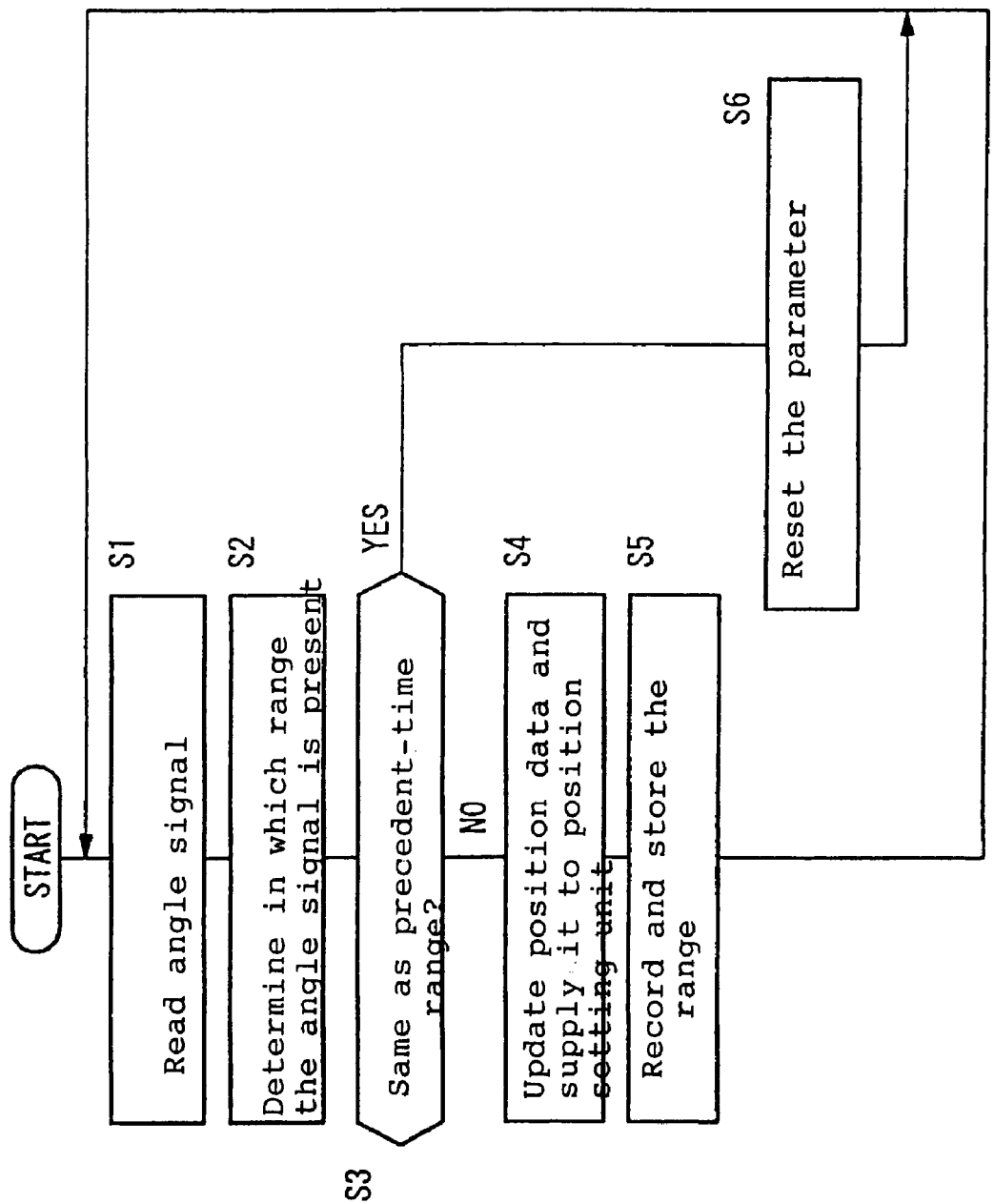
FIG. 7 is a flowchart of a process executed in a comparative determination unit.

On the other hand, in step S6, the supply of the position data D to the position setting unit 174 is not conducted, and a predetermined transmission parameter is reset. After step S5 or step S6, the present-time process shown in FIG. 7 is ended.

Now, the process executed in the position setting unit 174 will be described below referring to FIGS. 9 and 10. In the position setting unit 174, the position value Po is determined by referring to the reference table 172 corresponding to the six-speed return system. The six-speed return system, which is a known speed change system, will be described in brief. When the pedal is stepped in at the time of neutral, first speed is attained; on the contrary, when the pedal is pulled up at the time of neutral, second speed is attained. When the pedal is lightly pulled up at the time of first speed or when the pedal is lightly stepped in at the time of second speed, the transmission returns to neutral. Between first speed and second speed, the speed can be changed over by strongly stepping in or pulling up the pedal. As for second and higher shift positions, the transmission is shifted up according to the number of times the pedal is pulled up, and can be changed over up to 6th speed. Besides, the transmission is shifted down according to the number of times the pedal is stepped in. In the position setting unit 174, the shift position value Po is determined by the following procedure corresponding to the six-speed return system.

First, in step S101, at the time of system start when a power supply for the simulation system 12 is thrown in, the position setting unit 174 simultaneously starts operating, to conduct a predetermined initial setting. In this initial setting, the shift position value Po is set to a value indicative of neutral, i.e., a setting Po←0 is conducted. This ensures that, at the time of starting an operation, the operation is started from neutral, irrespectively of the condition in which the operation has been ended, so that labor for checking the position and an operation of returning to neutral are not necessary. In addition, at the time of finishing an operation, the power supply can be turned OFF without special attention to the shift position value Po.

In step S102, the reference table 172 is read into a predetermined access region. As shown in FIG. 10, the reference table 172 is a table in which the shift position values Po at respective time points and variations in the shift position value Po with the position data D are given. In addition, the column "FREE" indicates the case where all the bit data D1 to D3 are 0, namely, indicates that the gear shift pedal 70 is present in the region B of the reference position. In addition, when the bit data D0 and D1 are both "1," the bit data D0 in the lower level is given a higher priority, and when the bit data D2 and D3 are both "1," the second bit data D2 is given a higher priority. Therefore, the bit data D0 to D3 and "FREE" correspond to the ranges C1, N1, C2, N2, and B in this order. The range divisions are also given in FIG. 10 (and FIG. 11), in parenthesized form, for easy understanding.

In step S103, it is checked whether or not the position data D has been supplied from the comparative determination unit 170. More specifically, when the inclination angle of the gear shift pedal 70 is changed and the position data D is supplied by the process in the above-mentioned step S4, step S104 is entered by a predetermined interrupt process or the like, whereas when the position data D has not yet been supplied, the control process stands by.

In step S104, a modification value Q of the shift position Po is obtained by referring to the reference table 172. In the next step S105, an updating process of Po←Po+Q is executed.

For instance, in the case where the shift position value Po is Po=0 and the position data D is 1000 or 0010 (namely, in the case of the range N1 or N2), the column of D1 or D3 in the row of Po=0 is referred to, to find "0" recorded there, and this value is set as Q←0. In this case, in step S105, Po←0+0, so that the setting is not substantially changed.

In addition, in the case where the shift position value Po is Po=0 and the position data D is 0011 (namely, in the case of the range C1), the bit data D0 is given a higher priority, the column of D0 in the row of Po=0 is referred to, to find "+1" recorded there, and this value is set as Q←1. In this case, updating Po←0+1=1 is executed in step S105, with the result that the shift position value Po indicates a first speed.

On the contrary, in the case where the shift position value Po is Po=0 and the position data D is 1100 (namely, in the case of the range C2), the bit data D2 is given a higher priority, the column of D2 in the row of Po=0 is referred to, to find "+2" recorded there, and this value is set as Q←2. In this case, updating Po←0+2=2 is executed in step S105, with the result that the shift position value Po indicates a second speed.

At the time of a first speed, i.e., in the case where the shift position value Po is Po=1 and the position data D is 1000 (namely, in the case of the range 2), the column of D2 in the row of Po=1 is referred to, to find "−1" recorded there, and this value is set as Q←−1. In this case, updating Po←1−1=0 is executed in step S105, with the result that the shift position value Po indicates neutral. On the contrary, in the case where Po=2 and the position data D is 0010, updating is executed as Po←2−2=0.

In addition, in the case where the shift position value Po is Po=2 to 5 and where the position data D is 0010, the corresponding column is "0," so that the shift position value Po is not changed at all. Where the position data D is 0010, "+1" is recorded in the corresponding column, so that the shift position value Po is increased by 1 at a time this corresponds to a shift-up.

To be more specific, when a foot is placed off from the gear shift pedal 70 in the case where the shift position value Po is 2 or more, the pedal is returned to the reference position, and "0" in the column of "FREE" in the reference table 172 is referred to, so that the shift position value Po is not updated. When the gear shift pedal 70 is then further pulled up into the range C2, the shift position value Po is increased by 1 at a time. In this case, if the gear shift pedal 70 present in the range C2 is returned into the range N2 (namely, "0" in the column of "D3" is referred to), the pedal may not necessarily be returned into the range B indicative of the reference position, and the next shift-up can be carried out swiftly.

In the case where the shift position value Po is Po=3 to 6 and where the position data D is 1000, the corresponding column has "0," so that the shift position value Po is not changed at all. Where the position data D is 1100, "−1" is recorded in the corresponding column, so that the shift position value Po is decreased by 1 at a time, corresponding to a shift-down. In this case, also, even if the gear shift pedal 70 is not returned to the reference position, the next shift-down is enabled by returning the pedal into the range N1, so that a quick speed change can be attained.

In addition, in the case where the shift position value Po is Po=6 or Po=1 and where the position data D is 0011 or 1100, "0" is recorded in the corresponding column, so that a further shift-up or shift-down is not carried out.

In step S106, the shift position value Po is determined and is outputted to the speed change coping unit 162. In the speed change coping unit 162, a coping process such as a calculation of a simulated vehicle velocity is executed based on the shift position value Po obtained. After step S106, the control process returns to step S103, to continue the process of updating the shift position value Po.

In addition, while the reference table 172 has been described as a table corresponding to the six-speed return system, a reference table 172a (see FIG. 11) corresponding to the four-speed rotary system may be used, or both tables may be provided and either one of them may be selected.

As shown in FIG. 11, the reference table 172a is a table set in the same format as that of the reference table 172, and the shift position values Po are set in correspondence with Po=0 to 4. The four-speed rotary system, which is a known speed change system, will be described briefly. Each time the pedal is pulled up, the shift position value Po changes in the manner of 0→1→2→3→4→0, whereas each time the pedal is stepped down, the shift position value Po is cyclicly changed in the manner of 0→4→3→2→1→0.

Figure 9:
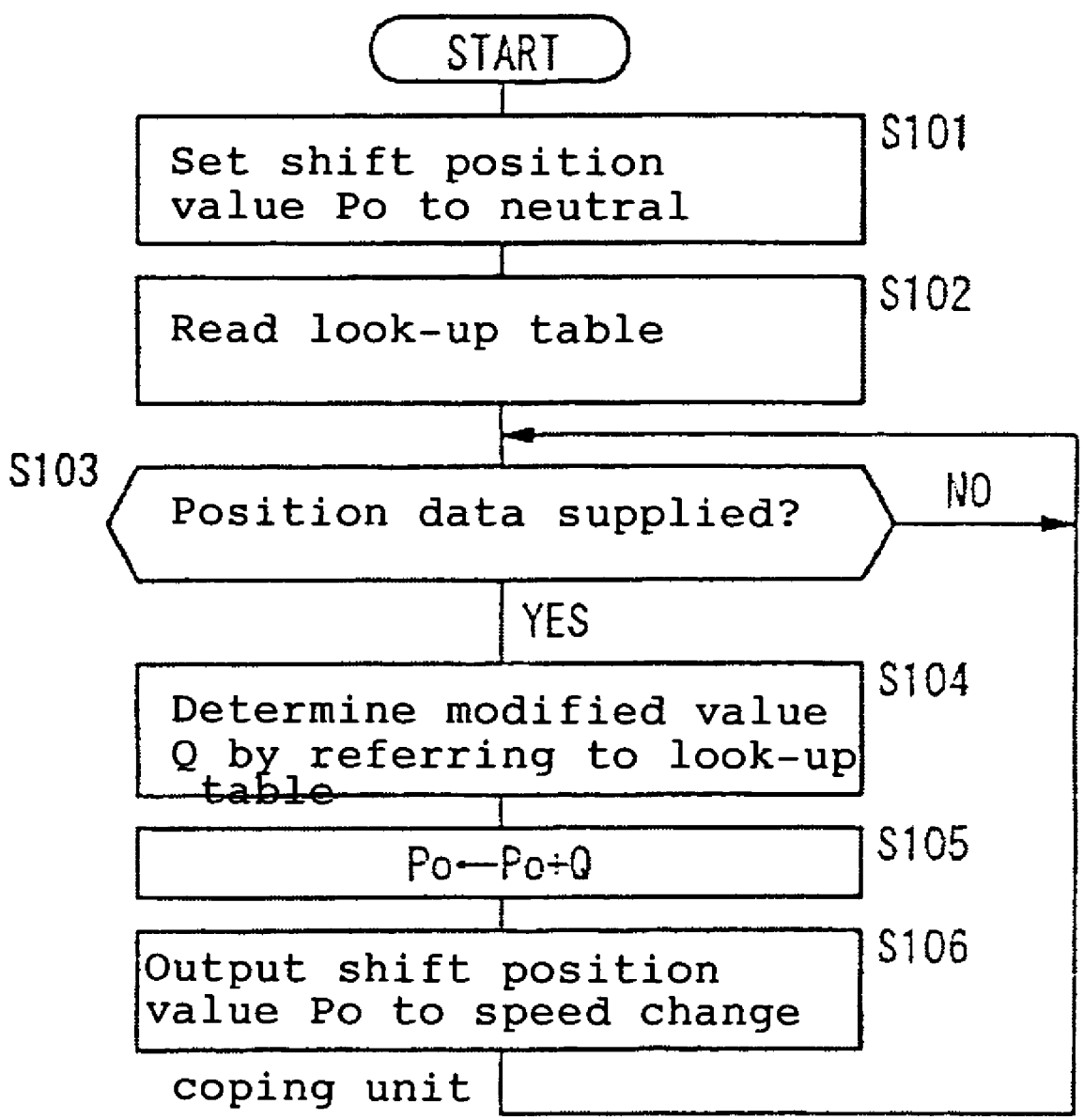
FIG. 9 is a flowchart of a process executed in a position setting unit.

The reference table 172a is applicable as it is, by the process shown in FIG. 9. More specifically, in the case where the shift position value Po is Po=0 to 3 and where the position data D is 0100, "+1" in the column of "D2" is referred to, and shift-up is carried out. In the case where the shift position value Po is Po=1 to 4 and where the position data D is 0001, "−1" in the column of "D0" is referred to, and shift-down is carried out.

In addition, in the case where the shift position value Po is Po=0 and where the position data D is 0001, "+4" in the column of "D0" is referred to, and updating to a fourth speed is carried out as Po←0+4. In the case where the shift position value Po is Po=4 and where the position data D is 0100, "−4" in the column of "D2" is referred to, and returning to neutral is carried out as Po←4−4.

In addition, in the rotary system, a predetermined dummy clutch operation or a dummy clutch sound or the like may be inserted or generated in "D1" and "D3".

Figure 12:
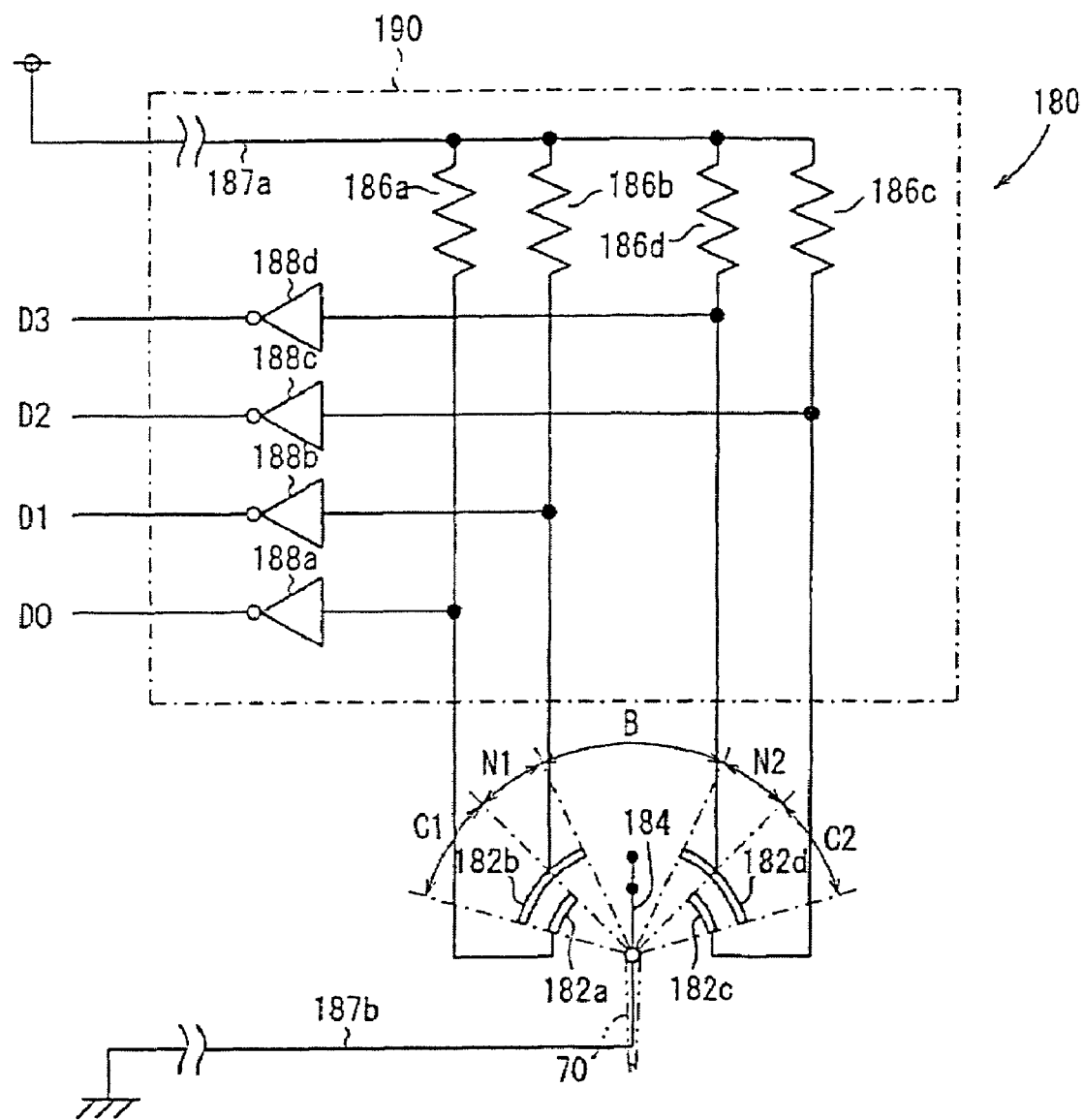
FIG. 12 is a block diagram of a switch including a plurality of contacts.

Further, while an example in which the potentio-sensor 120 is used as the position detecting means has been described in the above embodiment, a switch 180 having a plurality of contacts as shown in FIG. 12 may also be used. The switch 180 has four contacts 182a, 182b, 182c, and 182d, is turned ON upon contact therewith of a sliding electrode 184 connected so as to operate in conjunction with the inclination of the gear shift pedal 70, and is OFF when out of contact with the sliding electrode 184.

In addition, the switch 180 has an interface circuit 190 composed of pull-up resistors 186a to 186d and inverter gates 188a to 188d. One-side ends of the pull-up resistors 186a to 186d are connected to a power supply line 187a, and the other-side ends are connected to the contacts 182a to 182d. The input sides of the inverter gates 188a to 188d are connected to the contacts 182a to 182d. The sliding electrode 184 is connected to a ground line 187b. The power supply line 187a and the ground line 187b are connected to the control unit 22, and are connected to voltage portions corresponding to logical values of "1" and "0".

The contacts 182a to 182d are set to be ON according to the inclination angle of the gear shift pedal 70, as follows. The contact 182a is turned ON correspondingly to the range C1, and the contact 182b is turned ON correspondingly to the range C1 and the range N1. The contact 182d is turned ON correspondingly to the range C2 and the range N2, and the contact 182c is turned ON correspondingly to the range C2. When the gear shift pedal 70 is present in the range B indicative of the reference position, all the contacts are OFF.

According to the switch 180 thus configured, output signals from the contacts 182a to 182d are prescribed as the bit data D0, D1, D2, and D3, and show the same actions as those of the above-mentioned comparative determination unit 170. Therefore, in the position setting unit 174 supplied with the bit data D0 to D3 from the switch 180, the shift position value Po can be set by the same process as the process shown in FIG. 9. In addition, according to the switch 180, the position detecting means for detecting the inclination angle of the gear shift pedal 70 can be provided with a simple and inexpensive configuration. Further, the contact configuration of the switch 180 is not limited to the above-mentioned one. For example, for distinguishing five ranges B, N1, N2, C1, and C2, corresponding four or five contacts may be provided.

As has been described above, according to the transmission 10 in this embodiment, in regard of the inclination angle of the gear shift pedal 70, the first and second neutral detection positions and the first and second gear change positions greater in an inclination angle than the first and second neutral detection positions are detected, and the shift position value Po is determined based on the detection signal by the control unit 22. The speed change coping process can be carried out by the same operating method as that in a conventional real vehicle of the six-speed return system, the four-speed rotary system, or the like, based on the reference table 172 in the control unit 22, and versatility for corresponding also to other various speed change systems is provided. In addition, the pedal unit 62 lacks a shift arm and a shift drum which are provided in a transmission mechanism of a real vehicle, so that the pedal unit 62 has a simple and inexpensive configuration.

Now, a motorcycle 200 according to this embodiment will be described below referring to FIGS. 13 to 15. Hereinafter, the same portions as those in the transmission 10 or the simulation system 12 will be denoted by the same symbols as above, and detailed description thereof will be omitted.

Figure 13:
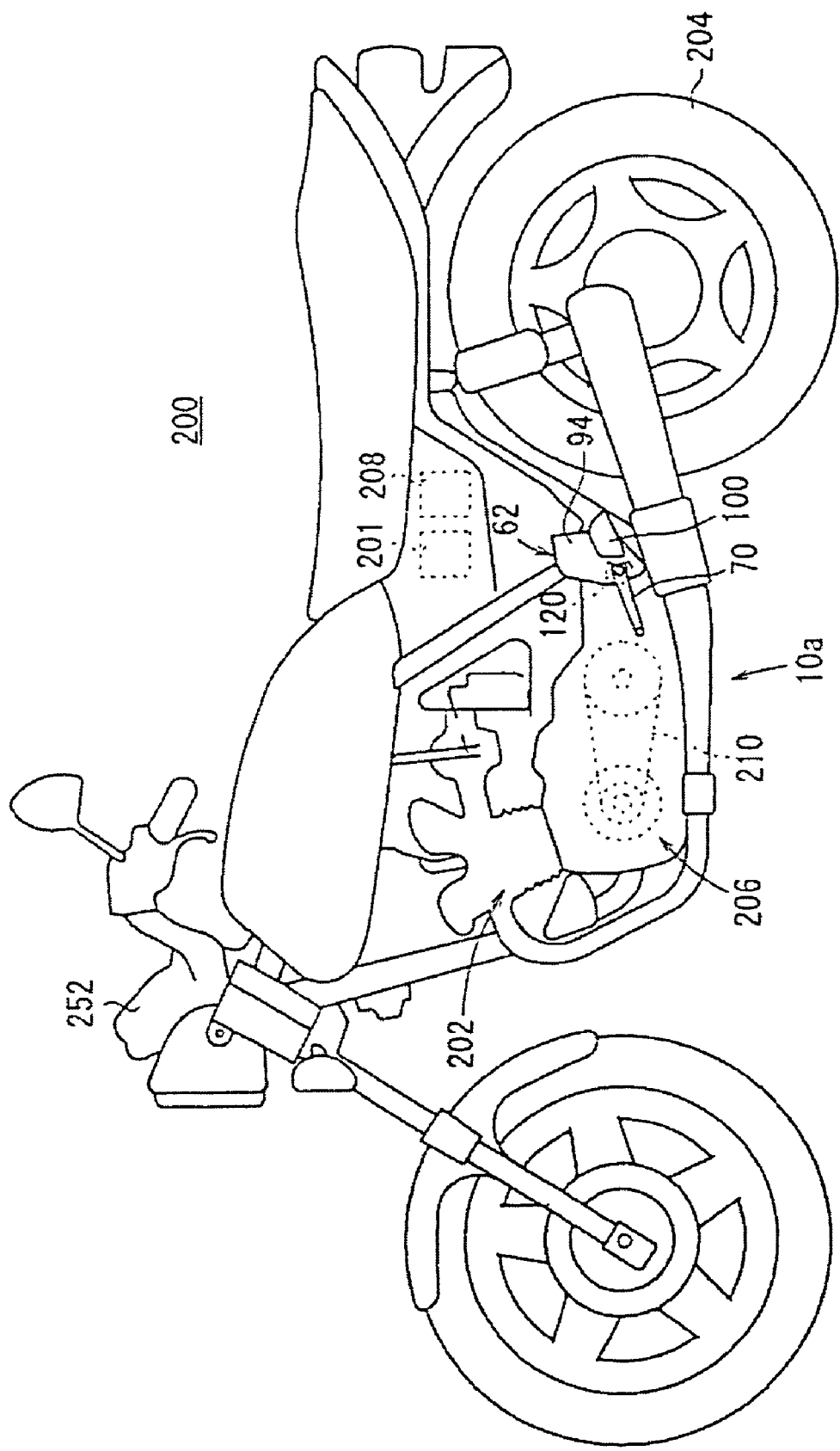
FIG. 13 is a schematic side view of a motorcycle.

As shown in FIG. 13, the motorcycle 200 has a transmission 10a. The motorcycle 200 is a real vehicle. The transmission 10a has a pedal unit 62 provided at a left step portion of the motorcycle 200, a control unit 201 for executing a process based on the inclination angle of the pedal unit 62 which is supplied from a potentio-sensor 120, a transmission 206 for varying the speed change ratio between an engine 202 (see FIG. 14) and a rear wheel 204, and a speed change ratio controller (speed change coping unit) 208 for controlling the transmission 206.

Figure 14:
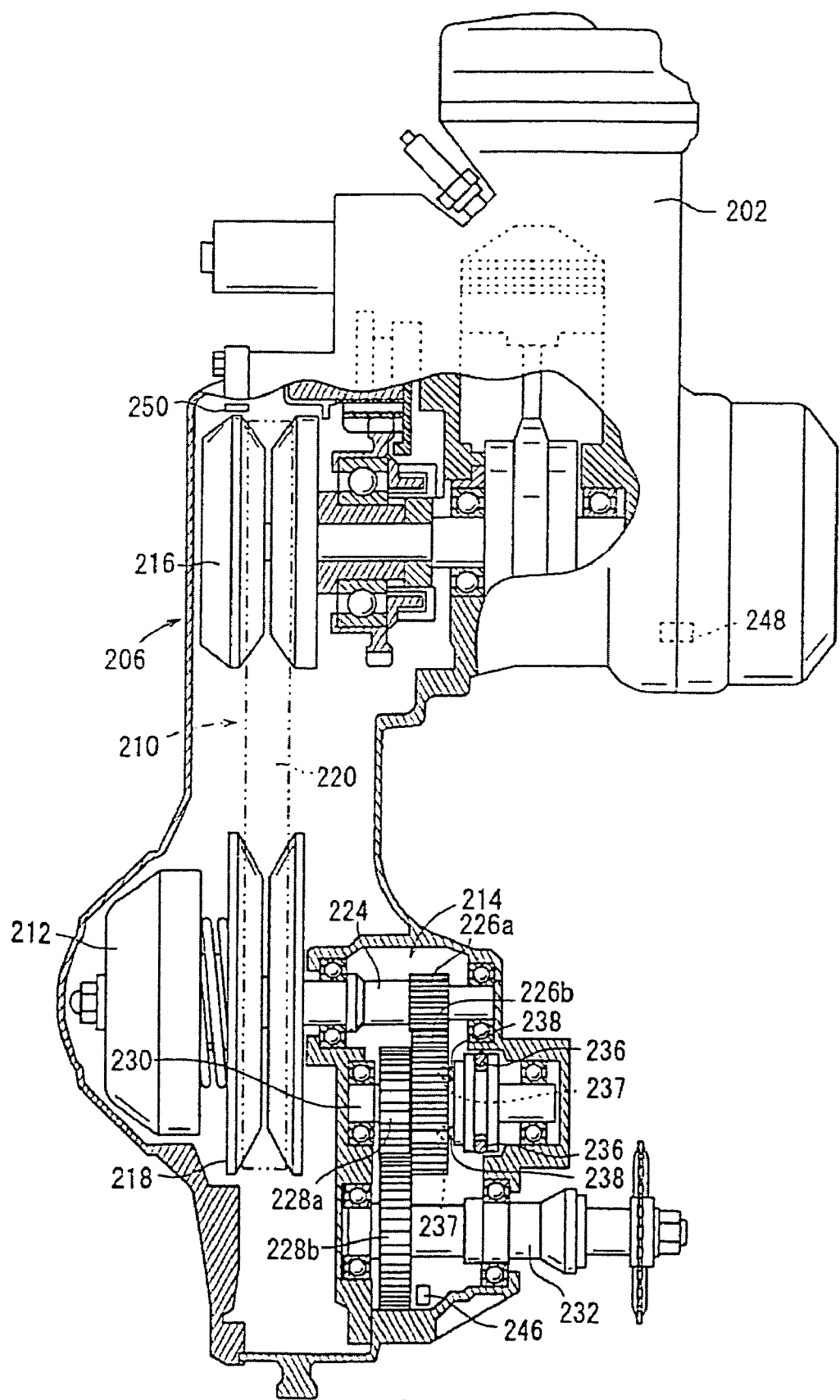
FIG. 14 is a sectional side view of an engine and a transmission.

As shown in FIG. 14, the transmission 206 has a CVT (Continuously Variable Transmission) 210, a centrifugal clutch 212 connected to the CVT 210, and a reduction mechanism 214. The CVT 210 has a belt 220 wrapped around a drive pulley 216 and a driven pulley 218, and power is transmitted therethrough. In the drive pulley 216 and the driven pulley 218, the pulley width is enlarged or reduced under the action of a speed change ratio controller 208, whereby a speed change ratio is set. An output shaft 224 rotated as one body with the driven pulley 218 is connected to the centrifugal clutch 212, and the connection and disconnection of power relative to the reduction mechanism 214 is automatically conducted according to the rotating speed of the driven pulley 218.

The reduction mechanism 214 has a drive gear 226a and a driven gear 226b which includes a gear pair on the input side, a drive gear 228a and a driven gear 228b which includes a gear pair on the output side, an intermediate shaft 230 coaxially fixed to the drive gear 228a, an output shaft 232 coaxially fixed to the driven gear 228b, a dog clutch 234 inserted in the intermediate shaft 230, and a fork 236 for causing the dog clutch 234 to advance and retract in the axial direction.

A part of the intermediate shaft 230 is splined, and the dog clutch 234 advances and retracts in engagement with the spline. The driven gear 226b is rotatably fitted over the intermediate shaft 230, and is provided between the dog clutch 234 and the driven gear 226b. The driven gear 226b is provided with a plurality of contact holes 237 in its side surface, and the dog clutch 234 opposed thereto is provided with a plurality of dog pawls 238 on its side surface. The fork 236 is operated by an actuator (not shown) operating under the action of the speed change ratio controller 208, causing the dog clutch 234 to advance or retract.

When the dog clutch 234 advances toward the driven gear 228b, the dog pawls 238 are engaged with the contact holes 237, whereby the rotation of the driven gear 228b is transmitted to the output shaft 232 through the dog clutch 234, the intermediate shaft 230, the drive gear 228a, and the driven gear 228b. The output shaft 232 is provided with a sprocket, and drives the rear wheel 204 through a chain. On the other hand, when the dog clutch 234 retracts, the dog pawls 238 come off from the contact holes 237, so that the rotation of the driven gear 228b is not transmitted to the intermediate shaft 230, and a neutral state results. In addition, preferred specific examples of the transmission 206 as described above include the transmission described in Japanese Patent Laid-Open No. 2005-106221. In addition, connecting and releasing means controlled by the controller, like the dog clutch 234, may be provided on the input side of the CVT 210.

Figure 15:
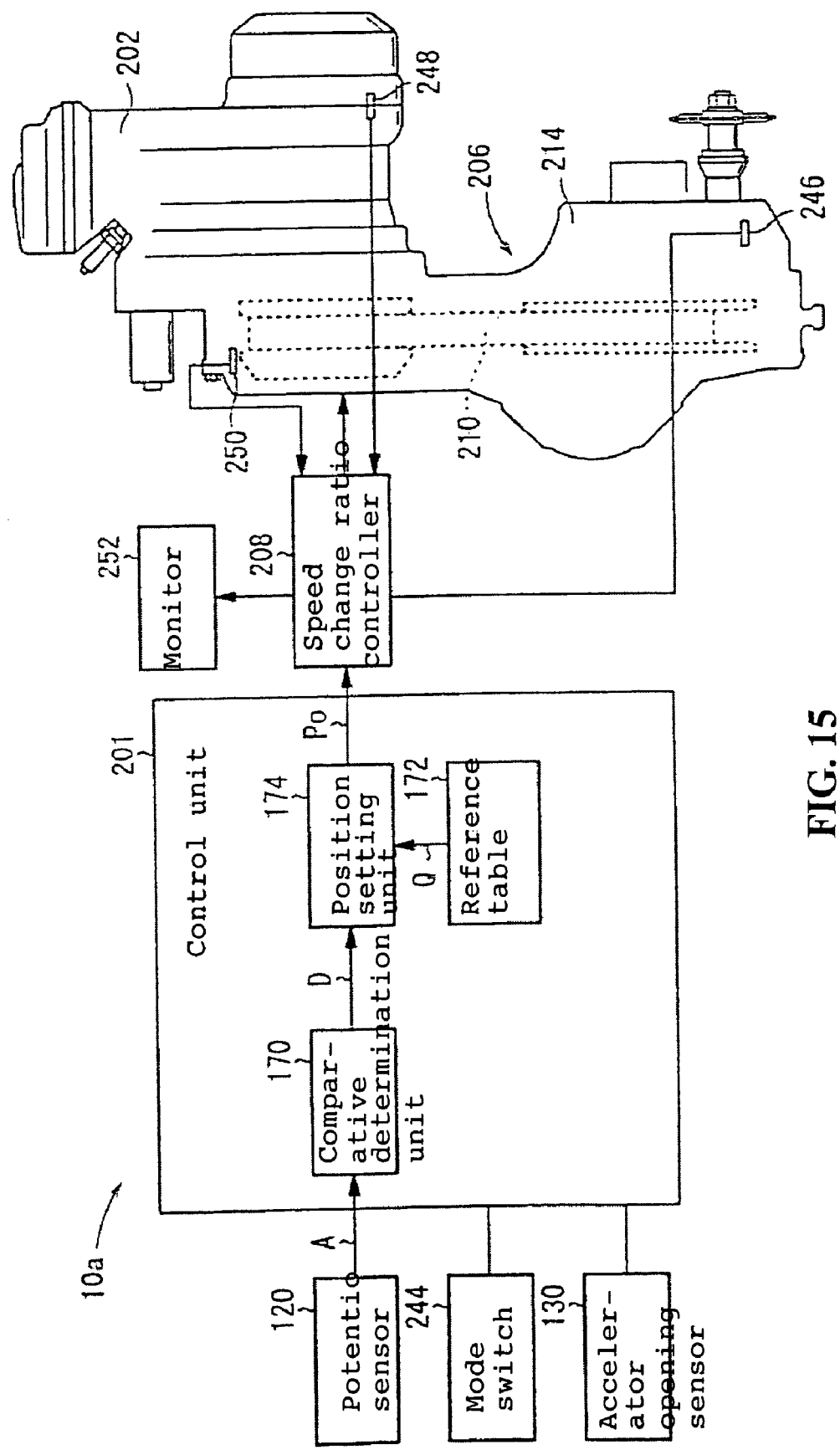
FIG. 15 is a block diagram of a transmission according to a modified example.

As shown in FIG. 15, the control unit 201 is provided with a comparative determination unit 170, a position setting unit 174, and a reference table 172. In the control unit 201, therefore, a shift position value Po can be determined based on a signal obtained from a potentio-sensor 120, in the same manner as in the above-mentioned control unit 22.

The speed change ratio controller 208 is supplied with the shift position value Po from the control unit 201. In addition, an accelerator opening sensor 130, a mode switch 244, a speed sensor 246, an engine speed sensor 248, a pulley position sensor 250, and the like are connected to the speed change ratio controller 208, and an accelerator operation amount, a mode signal, a vehicle velocity, an engine speed, a pulley width, and the like are supplied to the speed change ratio controller 208. The speed change ratio controller 208 sets a speed change ratio based on these signals, and controls the pulley widths of the drive pulley 216 and the driven pulley 218 as well as the fork 236. The shift position value Po, the vehicle velocity, the engine speed, and the like are supplied to and displayed on a monitor 252.

In the speed change ratio controller 208, the speed change system of the transmission 206 is controlled to be changed over between an automatic mode and a manual mode by operating a mode switch 244. In the automatic mode, the speed change ratio is set automatically and continuously, based on signals obtained from the accelerator opening sensor 130, the speed sensor 246, the engine speed sensor 248, and the like, and the pulley widths in the CVT 210 are regulated.

In the manual mode, six-stage intermittent speed change ratios or neutral are set based on the operation of the gear shift pedal 70, and the pulley widths in the CVT 210 are regulated or an advance/retraction control of the dog clutch 234 is conducted, based on the settings. More specifically, the shift position value Po is set as a value indicative of a position in the six-speed return system based on the reference table 172, and when Po=1 to 6, the speed change ratio controller 208 regulates the pulley widths so as to obtain a preset speed change ratio correspondingly to the shift position value Po. In this case, the dog clutch 234 is preliminarily caused to advance, and the dog clutch 234 is engaged with the driven gear 226b. In addition, when Po=0, the engagement between the dog clutch 234 and the driven gear 226b is canceled, resulting in neutral.

According to the transmission 10a as described above, the shift position value Po in the six-speed return system is determined in the same manner as in the above-described transmission 10. At the time of the manual mode, the same operating feelings as in the case of a conventional transmission mechanism are obtained. More particularly, in regard of an operation of shifting from neutral and an operation of returning to neutral, the same operations as in the case of a conventional transmission mechanism are conducted, so that an operator accustomed to the six-speed return type speed change system can easily be accustomed to this system. In addition, it is possible to cope with the four-speed rotary system or the like by rewriting the reference table 172 to the above-mentioned reference table 172a, so that versatility corresponding to various speed change systems is obtained. Further, by changing over to the automatic mode according to the rider's preference, an easy driving without the need for speed change operations can be realized.

The transmission for a motorcycle, the motorcycle, and the motorcycle simulation system according to the present invention are not limited to the above-described embodiments. Naturally, various configurations can be adopted without departing from the gist of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission for a motorcycle, comprising:
   a gear shift pedal operated by an operator and elastically inclined in two directions from a reference position;
   position detecting means for detecting the inclination of said gear shift pedal; and
   a control unit for determining a shift position value based on said inclination of said gear shift pedal obtained from said position detecting means and outputting said shift position value,
   wherein said position detecting means detects said inclination of said gear shift pedal through detecting said reference position, a neutral detection position set in a predetermined range of an angle from said reference position, and a gear change position greater in an inclination angle than said neutral detection position.

2. The transmission for a motorcycle as set forth in claim 1, wherein said position detecting means comprises a rotation sensor operative in conjunction with the rotation of a rotary shaft of said gear shift pedal, and a comparative determination unit for comparing an angular signal obtained from said rotation sensor with a threshold and outputting signals indicative of said reference position, said neutral detection position, and said gear change position.

3. The transmission for a motorcycle as set forth in claim 2, wherein said control unit initializes said shift position value to neutral at the time of an initial state.

4. A motorcycle comprising a transmission as set forth in claim 2.

5. A motorcycle simulation system comprising a transmission as set forth in claim 2.

6. The transmission for a motorcycle as set forth in claim 1, wherein said position detecting means includes a switch having a plurality of contacts; and
   said switch has a contact configuration for outputting signals indicative of said reference position, said neutral detection position, and said gear change position, according to the inclination angle of said gear shift pedal.

7. The transmission for a motorcycle as set forth in claim 6, wherein said control unit initializes said shift position value to neutral at the time of an initial state.

8. A motorcycle comprising a transmission as set forth in claim 6.

9. A motorcycle simulation system comprising a transmission as set forth in claim 6.

10. The transmission for a motorcycle as set forth in claim 1, wherein said control unit initializes said shift position value to neutral at the time of an initial state.

11. The transmission for a motorcycle as set forth in claim 1, wherein said neutral detection position includes a first neutral detection position set to a first direction from said reference position, and a second neutral detection position set to a second direction from said reference position; and
    said gear change position includes a first gear change position greater in inclination angle than said first neutral detection position, and a second gear change position greater in inclination angle than said second neutral detection position.

12. The transmission for a motorcycle as set forth in claim 11, wherein said control unit sets said shift position value to first speed and second speed when signals indicative of said first gear change position and said second gear change position are supplied from said position detecting means in the case where said shift position value is neutral, and returns said shift position value to neutral when said second neutral detection position is supplied in the case where said shift position value is the first speed or when said first neutral position is supplied in the case where said shift position value is second speed.

13. The transmission for a motorcycle as set forth in claim 12, wherein said control unit counts said shift position value when a signal indicative of said first or second gear change position is again supplied in the case where the signal received from said position detecting means has been changed over from a signal indicative of said first or second gear change position to a signal indicative of said first or second neutral position.

14. The transmission for a motorcycle as set forth in claim 11, wherein said control unit counts said shift position value when a signal indicative of said first or second gear change position is again supplied in the case where the signal received from said position detecting means has been changed over from a signal indicative of said first or second gear change position to a signal indicative of said first or second neutral position.

15. A motorcycle comprising a transmission as set forth in claim 1.

16. The motorcycle as set forth in claim 15, wherein the shift position value is outputted to a speed change ratio controller.

17. A motorcycle simulation system comprising a transmission as set forth in claim 1.

18. A transmission for a motorcycle, comprising:
    a gear shift pedal operated by an operator and elastically inclined in two directions from a reference position;
    a position detector configured to detect the inclination of said gear shift pedal; and
    a control unit configured to determine a shift position value based on said inclination of said gear shift pedal obtained from said position detector and outputting said shift position value,
    wherein said position detecting means detects said inclination of said gear shift pedal through detecting said reference position, a neutral detection position set in a predetermined range of an angle from said reference position, and a gear change position greater in an inclination angle than said neutral detection position.

19. A motorcycle comprising a transmission as set forth in claim 18, wherein the shift position value is outputted to a speed change ratio controller.

20. A motorcycle simulator comprising a transmission as set forth in claim 18.

* * * * *